US009195995B2

(12) United States Patent  
Tholkes et al.

(10) Patent No.: US 9,195,995 B2  
(45) Date of Patent: *Nov. 24, 2015

(54) GEOTARGETED NEWS AND ADVERTISEMENT DELIVERY SYSTEM

(71) Applicant: Nexstar Broadcasting, Inc., Irving, TX (US)

(72) Inventors: Michael Tholkes, St. Anthony, MN (US); David Boike, Maple Grove, MN (US)

(73) Assignee: Nexstar Broadcasting, Inc., Irving, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/479,265

(22) Filed: Sep. 5, 2014

(65) Prior Publication Data

US 2014/0378168 A1    Dec. 25, 2014

Related U.S. Application Data

(63) Continuation of application No. 13/340,927, filed on Dec. 30, 2011, now Pat. No. 8,903,426.

(60) Provisional application No. 61/448,098, filed on Mar. 1, 2011.

(51) Int. Cl.

| H04W 24/00 | (2009.01) |
|---|---|
| G06Q 30/02 | (2012.01) |
| H04W 4/20 | (2009.01) |
| H04W 4/02 | (2009.01) |

(52) U.S. Cl.  
CPC ........ *G06Q 30/0267* (2013.01); *G06Q 30/0261* (2013.01); *H04W 4/02* (2013.01); *H04W 4/206* (2013.01); *H04W 4/021* (2013.01)

(58) Field of Classification Search  
USPC ........ 455/456.3; 345/419, 473; 701/117, 420, 701/532  
See application file for complete search history.

(56) References Cited

U.S. PATENT DOCUMENTS

| 7,487,112 | B2 | 2/2009 | Barnes, Jr. | |
|---|---|---|---|---|
| 7,848,765 | B2 | 12/2010 | Phillips et al. | |
| 8,346,230 | B2 | 1/2013 | Goodmon et al. | |
| 8,423,004 | B2 | 4/2013 | Goodmon et al. | |
| 2005/0001743 | A1 | 1/2005 | Haemerle | |
| 2006/0080029 | A1* | 4/2006 | Kodani et al. ................. | 701/208 |
| 2006/0265118 | A1* | 11/2006 | Lee et al. ...................... | 701/117 |
| 2007/0229538 | A1* | 10/2007 | Klassen et al. ................ | 345/629 |
| 2011/0035284 | A1 | 2/2011 | Moshfeghi | |
| 2011/0130949 | A1* | 6/2011 | Arrasvuori .................... | 701/200 |
| 2013/0227708 | A1 | 8/2013 | Goodmon et al. | |

* cited by examiner

*Primary Examiner* — Shahriar Behnamian  
(74) *Attorney, Agent, or Firm* — Barcelo, Harrison & Walker, LLP (57) ABSTRACT

A system that provides content and/or ad publishers the ability to sell and target content, including "deals," to mobile devices of users when those users and their mobile devices are located within the defined geographic zone. The content may be targeted and mass distributed to all mobile devices having a registered address within the defined geographic area. The content creator and/or content distributor can manually define the regions where they desire to distribute content by plotting vertices on a map to form a polygon enclosing a geographic region. Regions may be defined by population, retail locations, content and/or ad categories and other relevant criteria. The System User can manage the type of message delivered based upon the time of day and day of the week. Such options provide the content creator with granular management of its content based upon the defined regions established by the content creator and/or content distributor.

14 Claims, 6 Drawing Sheets

GEOTARGETED NEWS AND ADVERTISEMENT DELIVERY SYSTEM

CROSS REFERENCE TO RELATED APPLICATION

This application is a continuation of U.S. patent application Ser. No. 13/340,927, filed Dec. 30, 2011, and entitled "GEOTARGETED NEWS AND ADVERTISEMENT DELIVERY SYSTEM"; which claims the benefit of U.S. Provisional Patent Application No. 61/448,098 having a filing date of Mar. 1, 2011. The contents of each of the foregoing applications are incorporated by reference herein in their entirety.

BACKGROUND OF THE INVENTION

Mobile advertising in the United States is projected to increase rapidly in the next few years with some estimates forecasting an increase from $213 million in 2009 to $2.02 billion in 2014. With some projections indicating that mobile advertising will be bigger than television advertising in a short period of time. Some sources estimate that people spend eighty percent (80%) of their disposable income in a three (3) to five (5) mile radius of their home or office. Providing an effective way to precisely target advertisements to individuals within such a defined geographic area is needed.

Existing solutions allow the content and/or ad publisher to target content and/or ads to consumers based on their geographic location by using a point-radius method, IP address, zip code or city. These methods deliver content and/or ads to wide target areas, failing to target small or more granular areas. For example, point-radius method limits targets to a circular radius, such as five miles, while IP address, zip code and city are unable to target neighborhoods, townships without zip codes, streets, categories, etc. The short comings in the prior art include: (1) geotarget ad delivery based upon a radius of a specific location, for example, deliver an advertisement within a five-mile radius of the location; and (2) deliver content and/or ads based upon industry defined locations including zip code, city or IP address. None of the existing providers can deliver content and/or ads based upon content and/or ad publisher's defined regions.

New and improved methods are needed by content and/or ad publishers to target content and/or ads to geo-aware devices based on smaller and/or more granular publisher-defined and customized geographic regions.

SUMMARY OF THE INVENTION

The present invention is directed toward a system that provides content and/or ad publishers the ability to sell and target content, including "deals," to a particular mobile device of a user when that user and their mobile device are located within the defined geographic zone. In addition, the content may be target and mass distributed to all mobile devices having a registered address within the defined geographic area.

The present system allows the content creator and/or the content distributor (hereinafter collectively and individually referred to as "the System User") to define the regions where they desire to distribute content. This can be defined by population, retail locations, content and/or ad categories and other criteria as deemed relevant. Additionally, the System User can manage the type of message that will be delivered based upon the time of day and day of the week. Such options provide the content creator with granular management of their content based upon the defined regions set-up by the content creator and/or content distributor.

Ad-hoc regions can be used to specifically target content to a consumer's geo-aware device. In one embodiment, the System User utilizes a map editor to identify and, if desired, subsequently revise the geographic zones in which content is targeted. In operation, the System User clicks on the map to place points. Consecutively placed points are connected by a line, and become vertices in a polygonal geofence which define a region. The System User may also be able to drag imprecise polygon points into the correct position. Further, the content and/or ad publisher can close the polygon by clicking on the origin point.

Regions are not limited by common geographical categories, and may span across and/or include areas in different area codes, zip codes, city boundaries, and/or state boundaries. Regions may be defined by street intersections, landmarks, survey benchmarks, or any other identified geographical marker, or by no geographical marker at all other than a placed polygon vertex. Additionally, the geographic regions may be ordered and reordered to create a region priority hierarchy. As regions may overlap, the region priority hierarchy defines which region's ads an end user will receive when the end user is located at a place covered by more than one region. A region's priority level may dictate whether an ad targeted for that region is transmitted to the end user rather than an ad targeted for another region. Region priority may be obtained through a bidding process in which the content creator with the highest bid gets top priority for its selected regions. Priority may also be given/purchased for which a specific ad is transmitted to the end user first within a single region. Once complete, the definitions of each polygon, the corresponding region and the priority data are stored in a database.

Any device that is geographically aware, whether via GPS, cell phone tower triangulation, known Wi-Fi hot spots or any other method that results in a latitude and longitude may display geographically targeted content and/or ads. The latitude and longitude of the mobile device may be obtained from the device through any available method for determining location. Preferably, software on the device sends the latitude and longitude of the device to an embodiment of the present system through a wireless or, in some cases, a wired network. In one embodiment, the system includes a Content Manager System which includes a processor. The Content Manager System compares the latitude/longitude pair with the existing region database and returns the highest-priority region that contains the geographic point. The content associated with that region is then transmitted to the device.

Other and further objects of the invention, together with the features of novelty appurtenant thereto, will appear in the course of the following description.

BRIEF DESCRIPTION OF THE SEVERAL VIEWS OF THE DRAWING

In the accompanying drawings, which form a part of the specification and are to be read in conjunction therewith in which like reference numerals are used to indicate like or similar parts in the various views.

DETAILED DESCRIPTION OF THE INVENTION

The following detailed description of the present invention references the accompanying drawing figures that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

Figure 1:
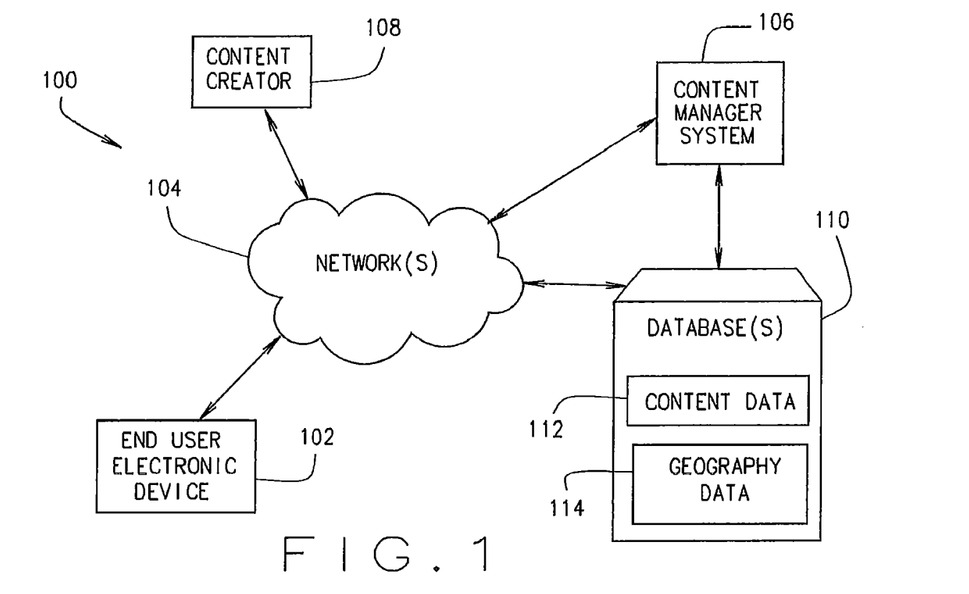
FIG. 1 is a block diagram of an example system according to an example embodiment.

FIG. 1 is a block diagram of an example system 100, according to an example embodiment. The system 100 is an example environment in which content provided by an advertiser or publisher (a "content creator") 108 is distributed to an End User's Electronic Device 102 by a content distributor, all via a network 104 such as the Internet. In one embodiment, the content distributor includes a Content Manager System 106 in communication with a database 110. In an example embodiment, the general operation of the example system 100 is as follows: a content creator 108 creates content data 112, and transmits same to the content manager system 106 via network 104. Content manager system 106 then stores said content data 112 in database 110. Content creator 108 then associates the content data with a geographic region. When an end user electronic device 102 moves into the selected geographic region, the content manager system 106 transmits the appropriate content data 112 to the end user electronic device 102.

The content manager system 106 also allows for the creation and storage of defined geographic regions. The content manager system 106 provides an electronic map of a geographic area, and accepts geographic location inputs as vertices of a polygon, where the polygon defines a geographic region on the map. The geographic regions may be created by anyone, though would preferably be created by a System User. Where the System User is a content creator 108, a new geographic region may be created at or around the time new content data 112 is sent to the content manager system 106, or the content creator 108 may create a new (or select a different) geographic region for already submitted content data 112.

Electronic device 102 may be a stand-alone device that solely provides at least some of the functionality to enable the display of location-based content, or may be a multi-use device that has functionality outside of same as described herein. Examples of electronic devices 102 include an IPHONE device by Apple, Inc., electronic devices powered by ANDROID by Google, Inc., and a BLACKBERRY device powered by Research In Motion Limited. Other types of mobile devices may also be used, such as laptops and other portable communication devices.

The network 104 by which the various devices and systems communicate may include, by way of example, mobile communications (GSM) networks, a code division multiple access (CDMA) networks, internet protocol (IP) networks, wireless application protocol networks, WiFi networks, IEEE 802.11 networks, and/or combinations thereof. Other conventional and/or later developed wired and wireless networks may also be used.

The content manager system 106 may be an electronic device and/or a computer system which includes a processor, and may be operated by a content distributor. The content manager system 106 may be in direct communication with the database 110, such as through local storage, and/or via a network (such as network 104). Additionally, in some embodiments, the content manager system 106 may transmit content to electronic device 102 via a mobile application or app that is downloaded and installed on the electronic device 102, or via a website or other internet-based method. The electronic device 102 may display content via the hardware functionality provided by the manufacturer of the device, such as a screen, speakers, etc. The electronic device 102 may be in a client-server relationship with the content manager system 106 or another server system, or in a different type of relationship with same. As will be understood, multiple devices may be used rather than single devices 102, 106, 110, etc.

Database 110 stores content data 112 and geography data 114 therein. Content data 112 may be advertisement data for transmission to end users to view. Geography data 114 may include data with respect to created regions and the geofences that define such regions. Either or both of the content data 112 and geography data 114 may include information regarding the priority of a given region or a given piece of content.

Figure 2:
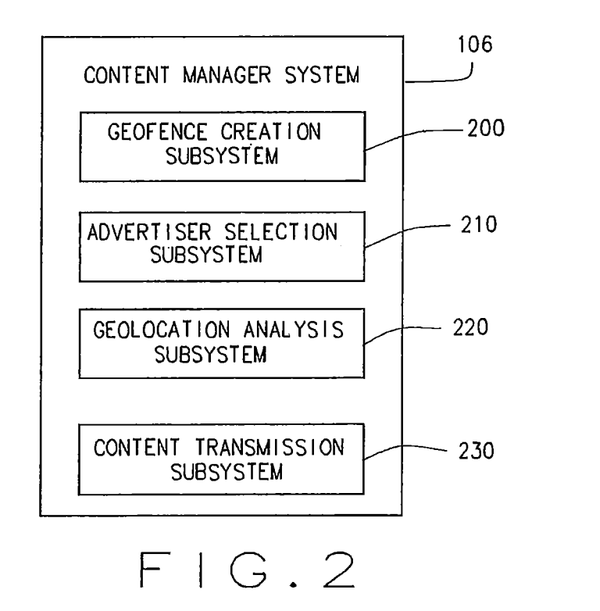
FIG. 2 is a block diagram of an example Content Manager System according to an example embodiment.

FIG. 2 illustrates a block diagram of an example content manager system 106 in an example embodiment. Content manager system 106 may include a geofence creation subsystem 200, an advertiser selection subsystem 210, a geolocation analysis subsystem 220 and a content transmission subsystem 230.

Figure 3A:
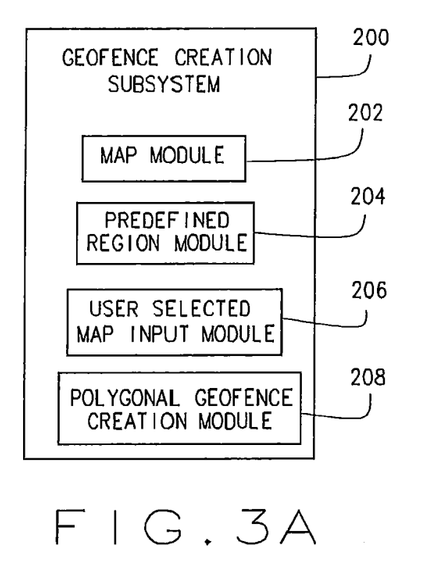
FIG. 3A is a block diagram of an example Geofence Creation Subsystem according to an example embodiment.

FIG. 3A illustrates a block diagram of an example geofence creation subsystem 200 in an example embodiment. As shown in FIG. 3A, an example geofence creation subsystem 200 may include a map module 202, a predefined regions module 204, a user selected map input module 206 and a polygonal geofence creation module 208. Map module 202 provides a map of a geographic area to a System User. User selected map input module 206 then allows the System User to input geographic locations which define vertices of a polygon, where the polygon defines a geographic region on the map. Generally, a System User will select such vertices, with the final vertex being the same as the first vertex, thereby "closing" the polygon. However, where the System User does not close the polygon, the user selected map input module 206 may simply consider a line between the first and last vertices to be the final side of the polygon by default. The sides of the polygon are considered a "geofence" which defines a geographic area therein. The sides of the polygon may be curved or straight, as chosen by the System User. A System User may also edit an existing geofence by deleting and/or moving vertices, and/or adding new vertices. Alternatively, a System User uses a pre-existing geographic region stored in database 110 via the predefined region module 204.

Figure 3B:
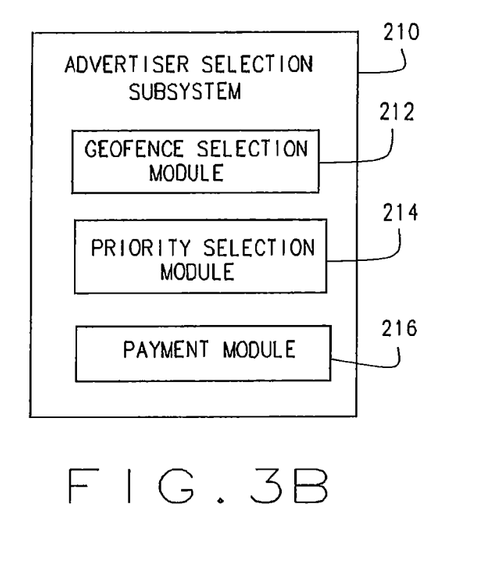
FIG. 3B is a block diagram of an example Advertiser Selection Subsystem according to an example embodiment.

FIG. 3B illustrates a block diagram of an example advertiser selection subsystem 210 in an example embodiment. As shown in FIG. 3B, an example advertiser selection subsystem 210 may include a geofence selection module 212, a priority selection module 214 and a payment module 216. A content creator 108 accesses the content manager system 106, and selects a geographic region via geofence selection module 212, and may either select a preexisting geofence stored in database 110, or may create a new geofence to define a new geographic region, as discussed above. Once a geofence or multiple geofences have been selected, the content creator associates content data 112 with the selected geofence(s). The content creator 108 may have previously uploaded content to the database 110 as content data 112, or may select preexisting content from database 110. The content creator 108 may then determine a priority level to give to the selected region(s) and/or the content. As regions may overlap, a higher priority region's associated content will take precedent over a lower priority region's content. Similarly, higher priority content will take precedent over lower priority content within a region, and thus be distributed first within that region. Generally, higher priority selections will cost additional money. The content distributor may alternatively have control over either or both of region priority levels and content priority levels, as well as correlation of content with regions. Finally, the content creator 108 effects payment via the payment module 216.

Figure 3C:
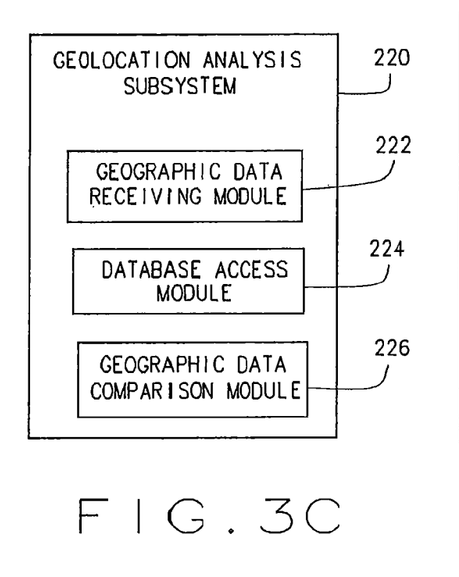
FIG. 3C is a block diagram of an example Geolocation Analysis Subsystem according to an example embodiment.

FIG. 3C illustrates a block diagram of an example geolocation analysis subsystem 220 in an example embodiment. As shown in FIG. 3C, an example geolocation analysis subsystem 220 may include a geographic data receiving module 222, a database access module 224 and a geographic data comparison module 226. The geographic data receiving module 222 actually receives the location data of an end user electronic device 102. The geographic data comparison module 226 then compares the location data received from the end user electronic device 102 with the various geographic regions stored as geography data 114 in database 110. Thus, the geographic data comparison module 226 determines if the end user electronic device 102 is within a geographic region, if any.

Figure 3D:
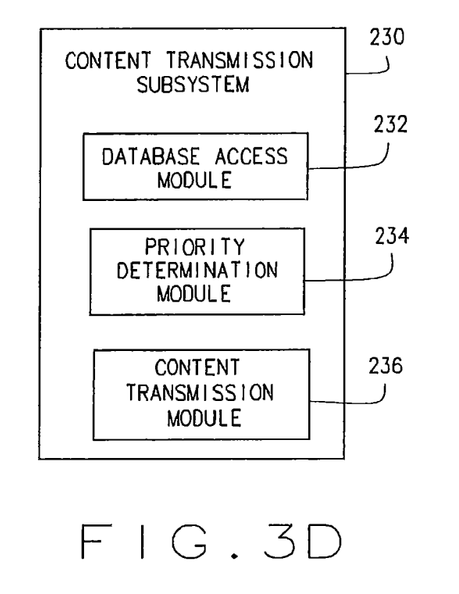
FIG. 3D is a block diagram of an example Content Transmission Subsystem according to an example embodiment.

FIG. 3D illustrates a block diagram of an example content transmission subsystem 230 in an example embodiment. As shown in FIG. 3D, an example content transmission subsystem 230 may include a database access module 232, a priority determination module 234 and a content transmission module 236. Upon determining that an end user electronic device 102 has entered a geofenced region, database access module 232 (which may be the same as database access module 224) accesses database 110 to retrieve the appropriate content data 112. Where there is a priority determination to be made, priority determination module 234 selects the region with the highest priority level and/or the content with the highest priority level. Content transmission module 236 then transmits the selected content data 112 to the end user electronic device 102 for display thereon.

Figure 4A:
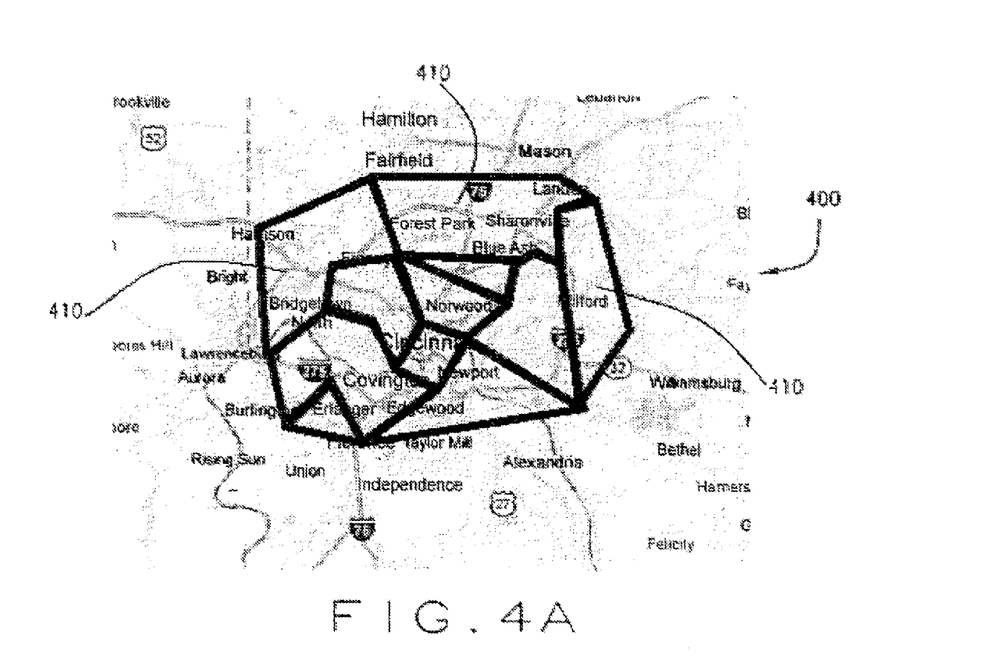
FIG. 4A is an example map showing example Geofenced regions thereon.
Figure 4B:
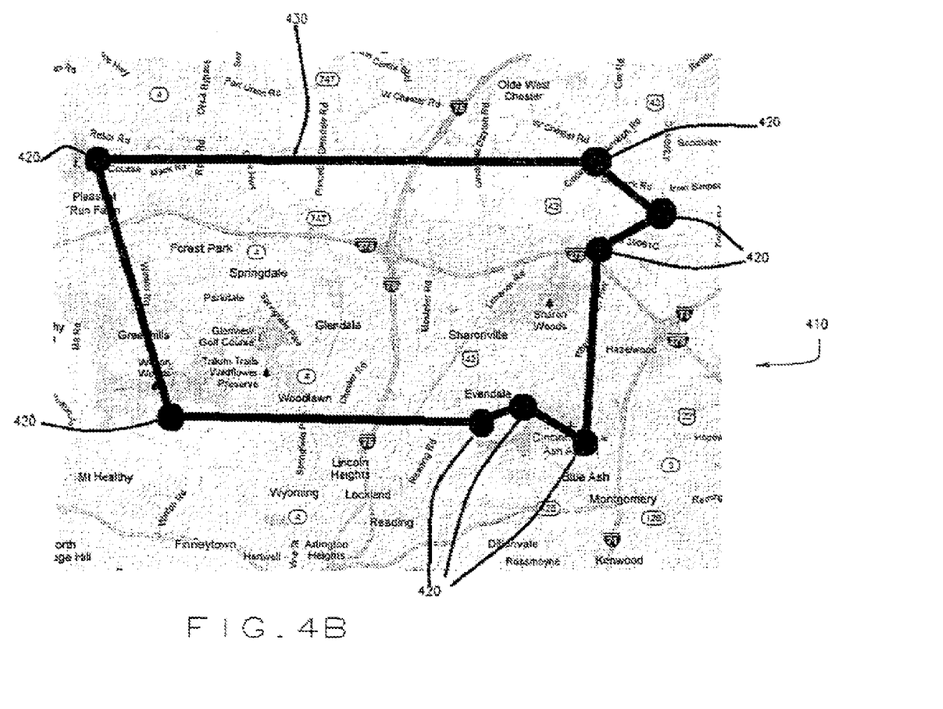
FIG. 4B is a close-up of an example Geofenced region from the map of FIG. 4A.

FIG. 4A illustrates an exemplary map 400 which is displayed to a System User by map module 202. Displayed on map 400 are various geographic regions 410. Although none of the regions 410 on map 400 overlap, such overlapping regions are possible. FIG. 4B illustrates a close-up view of a geographic region 410 from map 400. Geographic region 410 in FIG. 4B is defined by lines 430 connecting the polygonal vertices 420. Lines 430 combine to form a geofence which defines the polygonal borders of geographic region 410.

Figure 5:
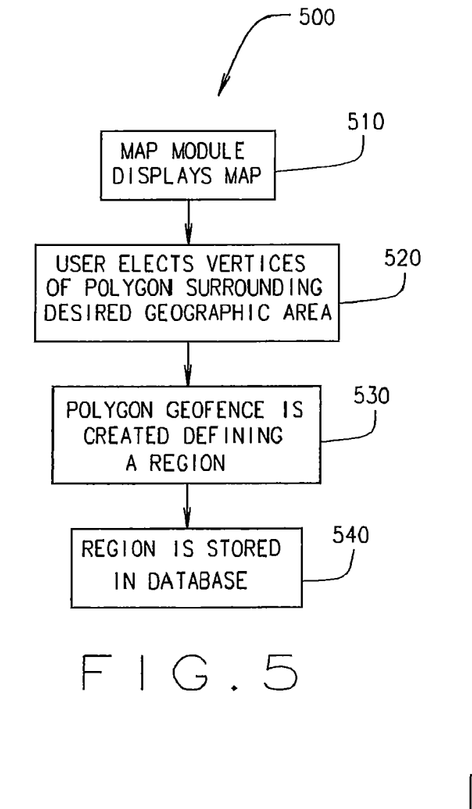
FIG. 5 is a flow chart of an example Geofenced region creation procedure.

FIG. 5 illustrates an example procedure 500 for creating a new geographic region. At step 510, a map 400 is displayed to a System User via en electronic device such as a computer, tablet, smartphone, etc. as would be understood by one of ordinary skill in the art. The map 400 may be rendered via FLASH provided by Adobe Systems, Inc., HTML5, or any suitable present or future language which allows for the display of an interactive map 400.

At step 520, a System User may select vertices 420 for the polygonal geofence 430 which will define the geographic region 410. The System User may click on the map 400 to place a vertex 420, may enter the latitude and longitude of a vertex 420, or may input a vertex point 420 by any other relevant method. Preferably, when the System User has finished creating the geofence 430, the "final" vertex 420 is entered at the same place as the first vertex 420, to "close" the polygonal geofence 430. However, if the System User does not select the first vertex 420 as the final vertex 420 as well, the system may automatically "close" the polygonal geofence by connecting the last vertex 420 input with the first vertex 420 input. This creates a new geographic region, as in step 530. At step 540, the new region is stored in database 110.

Figure 6:
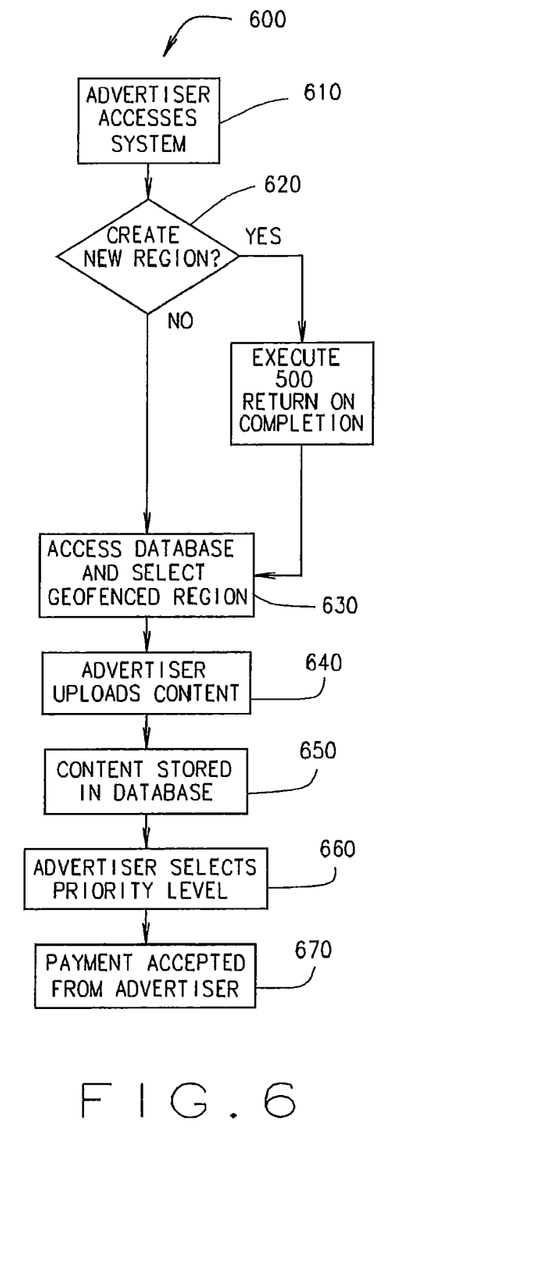
FIG. 6 is a flow chart of an example procedure for allowing an advertiser to upload an ad for a selected geofenced region.

FIG. 6 illustrates an example procedure 600 for allowing a System User to select a geographic region and associate it with uploaded content data 112. Content data 112 may be audio data, such as a "radio" advertisement, video data such as a "commercial," visual data such as a digital representation of a print advertisement, or any other suitable data type. At step 610, a System User accesses the content manager system 106. At step 620, the System User decides whether to create a new geographic region 410 or select an existing geographic region 410 from database 110. Where the System User decides to create a new geographic region 410, the procedure shifts to procedure 500, and returns to step 630 when finished. If the System User decides to select an existing region 410, the procedure advances to step 630 where the database 110 is accessed and a preexisting geographic region 410 is selected. At step 640, where the System User is the content creator 108, the System User uploads content to be associated with the selected region 410, and at step 650 the content is stored in database 110. Where the System User is the content distributor, the content distributor may merely select pre-uploaded content to be associated with selected region 410. It is noted that multiple regions 410 may be selected. At step 660, the System User selects the priority level for the selected/created region 410 and/or for the content, if applicable. At step 670, payment is accepted from the content creator 108 where the System User is the content creator 108.

Where the content distributor defines the regions 410, a content creator 108 may be given the option only to select a predefined region 410. Similarly, where the content distributor determines region priority and/or content priority, the content creator 108 may not be given the option for selecting priority levels.

Figure 7:
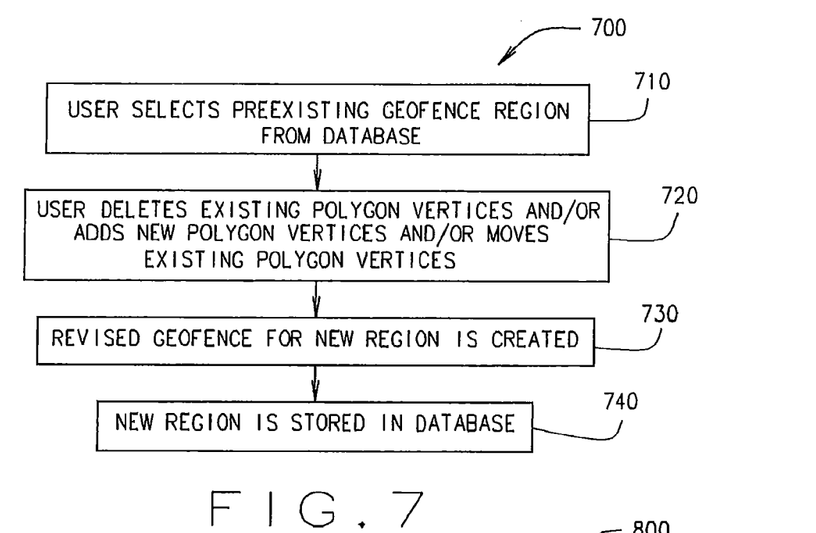
FIG. 7 is a flow chart of an example procedure for allowing a user to revise an existing geofenced region.

FIG. 7 illustrates an example procedure 700 for modifying an existing geographic region 410. At step 710, a System User selects a preexisting geographic region 410 from database 110. At step 720, the System User modifies one or more than one existing vertex 420. The System User may delete an existing vertex, at which point the content manager system 106 will connect the preceding and subsequent vertices with a geofence. The System User may also click and drag on an existing vertex 420 to move it to a different location, and/or add new vertices 420 between existing vertices. At step 730, the System User finishes modifying the region 410, and a new geographic region is created. At step 740, the new geographic region 410 is stored in database 110.

Figure 8:
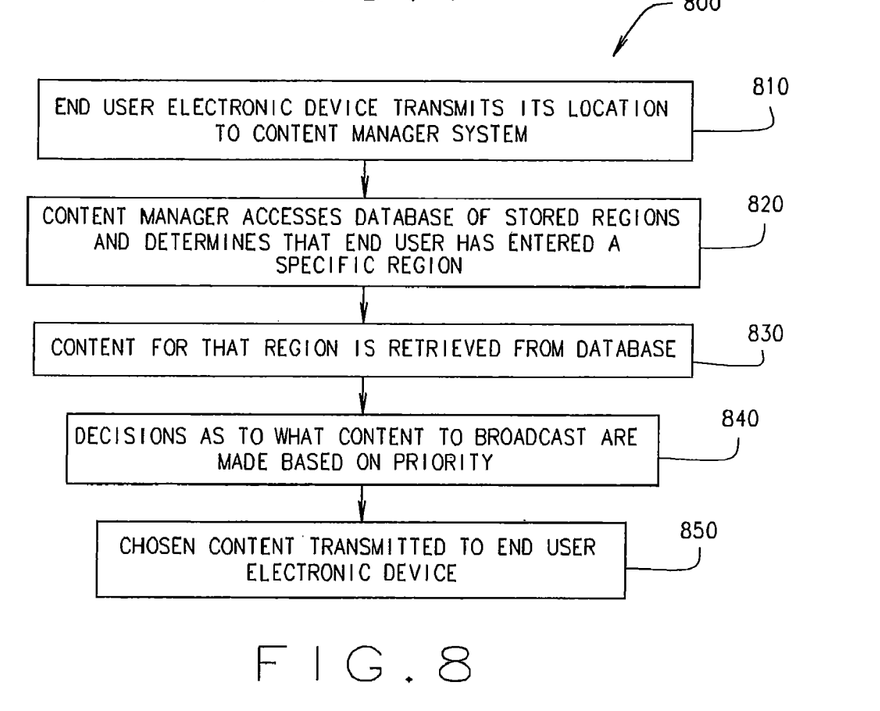
FIG. 8 is a flow chart of an example procedure for delivering an advertisement to an End User's Electronic Device.

FIG. 8 illustrates an example procedure 800 for distributing content to an end user electronic device 102. At step 810, an end user electronic device 102 transmits its location to the content manager system 106. At step 820, the content manager system 106 accesses database 110 and the stored geographic data 114 therein, and determines that the end user electronic device 102 has entered a specific geographic region 410. Where the end user electronic device 102 is determined to have entered multiple regions 410, content manager system 106 determines the region 410 with the highest priority and proceeds with same as the selected region 410. At step 830, the content associated with that specific geographic region 410 is retrieved from database 110. At step 840, the content manager system 106 determines which content has the highest priority level. Other considerations, such as the number of times a given selection of content has been transmitted to end users in a given time period or the time of year/day/week, may be taken into account, as may other considerations as would be known to one of ordinary skill in the art. At step 850, the selected content is transmitted to the end user electronic device 102 for display thereon.

Content data 112 may be transmitted as part of an internet radio broadcast, as part of streaming internet video, or could be a stand-alone advertisement. Where content data 112 is transmitted as part of a streaming internet broadcast, the radio/video broadcaster may control the content manager system 106, in which case the content manager system 106 could be integrated into the radio/video broadcast to automatically transmit content data 112 during commercial breaks. Where the content manager system 106 is operated by a separate entity from the radio/video broadcaster, the broadcaster may have in place advertisement "breaks" which automatically send advertisement requests to local operators of content manager systems 106. In that situation, the local operator's content manager system 106 distributes the appropriate content when it receives such a break request from the broadcaster.

When the end user views the content, the end user may click on or otherwise select the content, which may lead the end user to a pre-defined content or advertisement, such as a web page. The pre-defined content or advertisement may be created by the content creator with additional information as to the content delivered to the end user.

From the foregoing, it will be seen that this invention is one well adapted to attain all ends and objects hereinabove set forth together with the other advantages which are obvious and which are inherent to the structure.

It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative, and not in a limiting sense.

Many changes, modifications, variations and other uses and applications of the present constructions will, however, become apparent to those skilled in the art after considering this specification and the accompanying drawings. All such changes, modifications, variations and other uses and applications which do not depart from the spirit and scope of the invention are deemed to be covered by the invention which is limited only by the claims which follow. The scope of the disclosure is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims, which follow.

We claim:

1. A system for providing content comprising:
   a database for storing content provided by a content creator in an electronic memory; and
   a content manager for accepting geographic location inputs as vertices of a polygon on a digital map, said polygon defining boundaries of a geographic region, where the content is associated with said geographic region;
   said content manager including a processor for comparing said geographic region with geographic location data associated with an end user electronic device, and transmitting the content associated with the geographic region to the end user electronic device when said geographic location data is within said geographic region;
   wherein a first geographic region at least partially overlaps a second geographic region; and
   wherein the first geographic region comprises a first priority level and the second geographic region comprises a second priority level.

2. The system of claim 1 wherein the digital map is interactive, allowing a system user to input vertices by clicking on the desired vertex locations on said map.

3. The system of claim 1 wherein the vertices are input by latitude and longitude coordinates.

4. The system of claim 1 wherein the content is associated with more than one geographic region.

5. A content manager system for providing content comprising:
   a geofence creation subsystem for providing a digital map of a geographic area and accepting geographic location inputs as vertices of a polygon on said map, said polygon defining boundaries of a geographic region;
   an advertiser selection subsystem for allowing a content creator to associate content with at least one geographic region;
   a geolocation analysis subsystem for receiving geographic location data from an end user electronic device and comparing the geographic location data with the geographic region; and
   a content transmission system for transmitting the content associated with the at least one geographic region to the end user electronic device when said geographic location data is within the at least one geographic region;
   wherein a first geographic region at least partially overlaps a second geographic region; and
   wherein the first geographic region comprises a first priority level and the second geographic region comprises a second priority level.

6. The system of claim 5 wherein the digital map is interactive, allowing a system user to input vertices by clicking on the desired vertex locations on said map.

7. The system of claim 5 wherein the vertices are input by latitude and longitude coordinates.

8. The system of claim 5 wherein the content is associated with more than one geographic region.

9. A method for presenting geographically targeted content comprising:
   providing, via a processor, a digital map of a geographic area;
   receiving inputs of geographic locations as vertices of a polygon on said map, said polygon defining boundaries of a first geographic region, and storing said inputs in electronic memory of a database;

receiving content associated with the first geographic region;

determining the geographic location of an end user electronic device;

comparing, via a processor, the geographic location of the end user electronic device with said first geographic region; and displaying said content associated with said first geographic region on a display of said end user electronic device when said geographic location is within said first geographic region;

wherein a first geographic region at least partially overlaps a second geographic region; and wherein the first geographic region comprises a first priority level and the second geographic region comprises a second priority level.

10. The method of claim 9 wherein the vertices are input by a system user by clicking on the desired vertex locations on said map.

11. The method of claim 9 wherein the vertices are input by latitude and longitude coordinates.

12. The method of claim 9 wherein the content is associated with more than one geographic region.

13. An end user electronic device for displaying content comprising:

a geofence subsystem for providing a digital map of a geographic area and accepting geographic location inputs as vertices of a polygon on said map, said polygon defining boundaries of at least one geographic region;

an advertiser selection subsystem for associating content with the at least one geographic region;

a geolocation analysis subsystem for determining a geographic location of the end user electronic device and comparing the geographic location with the at least one geographic region; and a display for displaying the content associated with the at least one geographic region when said geographic location of the end user electronic device is within the geographic region;

wherein a first geographic region at least partially overlaps a second geographic region; and wherein the advertiser selection subsystem accepts a priority level input for each of the overlapping first and second regions.

14. The end user electronic device of claim 13 wherein the content is associated with more than one geographic region.

* * * * *